Patented Dec. 1, 1925.

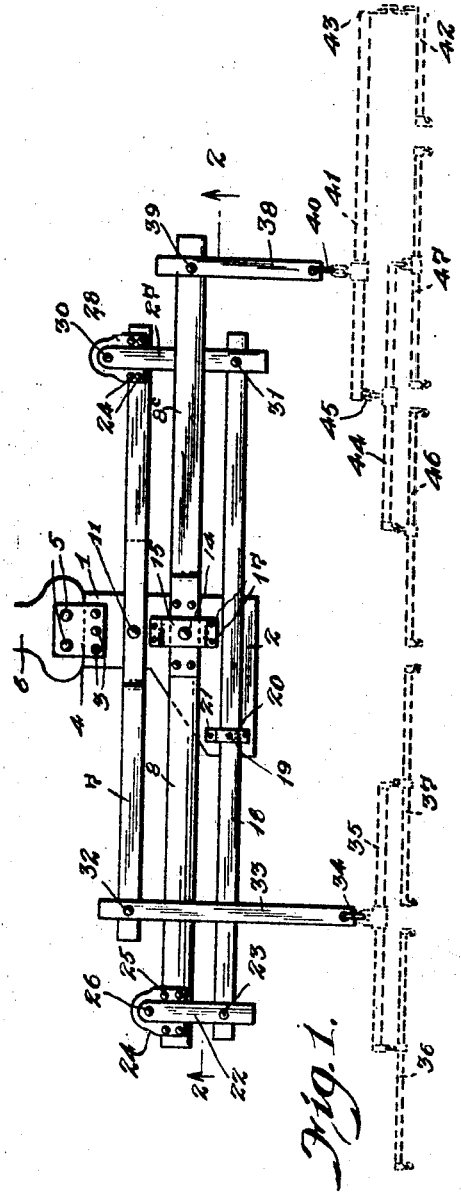
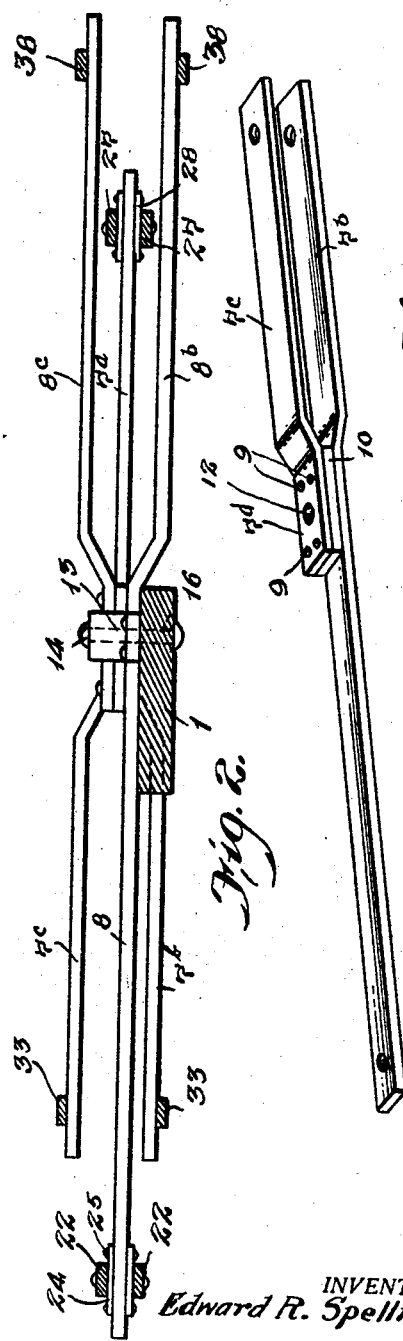

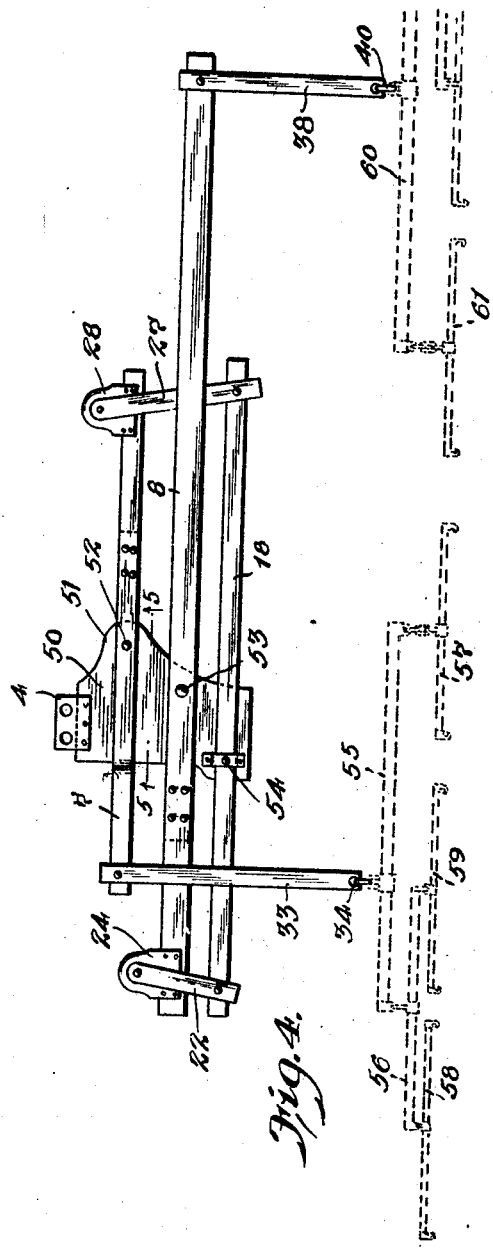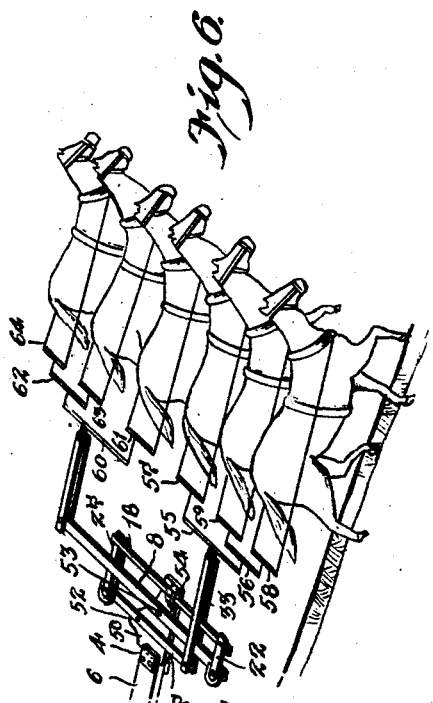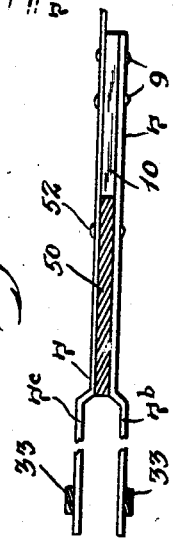

1,563,804

UNITED STATES PATENT OFFICE.

EDWARD R. SPELLMAN, OF WALLA WALLA, WASHINGTON.

DRAFT EQUALIZER.

Application filed February 4, 1924. Serial No. 690,561.

*To all whom it may concern:*

Be it known that I, EDWARD R. SPELLMAN, a citizen of the United States, residing at Walla Walla, in the county of Walla Walla, State of Washington, have invented certain new and useful Improvements in Draft Equalizers, of which the following is a specification.

My invention relates to improvements in draft equalizers, and it consists in the combinations, constructions, and arrangements herein described and claimed.

More specifically, the present invention is an improvement over the construction disclosed in Letters Patent of the United States, No. 1,078,386, granted to me on Nov. 11, 1913, said improvement consisting in the provision of a novel arrangement of draft members and connecting parts, whereby the pull exerted by a plurality of draft animals on an implement to which they are hitched by means of the device will be transmitted in a single horizontal plane to the implement.

A further object of the invention is to provide a draft equalizer of the character described which affords facilities for hitching a plurality of draft animals to an implement, such as a plow, so that the animals may walk abreast, only one of the draft animals walking in the last furrow and the remaining draft animals walking on the unplowed ground without causing any side draft and without occasioning any pushing action on the draft beams to which the animals are hitched, whereby the draft will be equally distributed among the draft animals.

Other objects and advantages will be apparent from the following description, considered in conjunction with the accompanying drawings, in which:

Figure 1 is a plan view showing a draft equalizer embodying the invention and adapted for the use of five draft animals, Figure 2 is a section on the line 2—2 of Fig. 1, Figure 3 is a perspective view of one of the draft beams, Figure 4 is a view similar to Fig. 1, showing a draft equalizer embodying the invention and adapted for the use of six draft animals, Figure 5 is a fragmentary sectional view, the view being taken along the line 5—5 of Figure 4, and Figure 6 is a fragmentary perspective view showing the application and use of the draft equalizer for six draft animals.

Referring now to the drawings, the draft equalizer for five draft animals comprises a draw plate 1 which has the forward end portion thereof enlarged laterally at one side, as indicated at 2. The draft plate 1 may have the rearward end portion thereof rigidly connected at 3 with a pair of attaching plates, such as that indicated at 4 in Figure 1, the attaching plates 4 having the forward end portions thereof disposed in straddling relation to the rearward end portion of the plate 1 and having the other end portions thereof adapted to be rigidly secured, as at 5, to the forward end of the beam 6 of a plow or like agricultural implement. The plate 1 thus will be rigid with the beam 6 and the longitudinal median line of the plate 1 will be aligned with the longitudinal median line of the beam 6.

Two elongated primary draft beams 7 and 8, respectively, are provided, the draft beam 8 being longer than the draft beam 7. The draft beam 7 is best seen in Figure 3 and as clearly shown therein comprises a bar $7^a$ which has a portion $7^b$ of less than one-half the length thereof offset downwardly to provide one of a pair of forks. The other fork of the beam may consist of an upwardly offset portion $7^c$ of a second bar which has an attaching portion $7^d$ connected with the body of the bar $7^a$ by suitable fastening devices 9, the portion $7^d$ being spaced from the body of the bar $7^a$ by a spacing plate 10 through which the fastening devices 9 extend. With the arrangement just described, the forks $7^b$ and $7^c$ of the beam 7 will be parallel to each other for the greater part of their length and will be located approximately equi-distant from the plane of the body or stem portion of the beam 7.

The beam 7 is pivotally supported on the draw plate 1 by means of a vertical pivot element 11 which extends through an opening 12 in the intermediate portion of the beam 7, said opening 12 passing through the superposed portions $7^d$, spacing plate 10 and underlying portion of the bar $7^a$, and being located equi-distant from the opposite ends of the beam, and the pivot element 11 also extending through a vertical opening which is formed in the draw plate 1 adjacent to the rearward end of the latter and on the longitudinal median line of the draw plate.

The beam 8 has substantially the same construction as the beam 7 and includes forks 8[b] and 8[c] which extend in parallel relation to each other for the greater part of their length and for a length less than one-half that of the complete beam. The beam 8 is longer than the beam 7, as hereinbefore stated, and is provided intermediate its ends with a vertical opening 13 which is arranged in register with the vertical opening through the draw plate 1, whereby the beam 8 may be pivotally supported on the draw bar through the agency of a vertical pivot member 14 which extends through an opening in a strap 15 and then through the aligned openings in the beam 8 and the draw plate 1. The last-mentioned opening in the draw plate 1 is indicated at 16 in Figure 2 and also is located in intersecting relation to the longitudinal median line of the draw plate 1 but forwardly of the plane of the pivotal connection of the beam 7 with the draw plate. The strap 15 extends transversely across the beam 8 and is secured adjacent to its opposite ends to the plate 1 by fastening devices 17.

The draft beams 7 and 8 are respectively arranged on the draw plate 1 so that the forked ends thereof extend laterally of opposite sides of the draw plate.

A balancing bar 18 extends transversely across the enlarged portion 2 of the draw plate 1 in spaced relation to the draft beam 8 and is secured upon the plate by a vertical pivot element 19 which extends through vertically aligned openings in a strap 20 spanning the bar 18 and secured at 21 to the plate, the bar 18 and the enlarged portion 2 of the plate, the axis of the pivot element 19 intersecting the balancing bar 18 at a point approximately one-third of the distance from one end of the balancing bar 18 to the other end thereof and intersecting the enlarged portion of the draw plate 1 at a point lateral of the longitudinal median line of the plate 1.

A pair of vertically spaced horizontal links or connecting bars 22 respectively are disposed in contiguous relation to the upper and lower faces of the balancing bar 18 and are pivotally connected, at 23, to the balancing bar adjacent to one end of the latter. The links 22 straddle the arms of a rearwardly extending clevis plate 24 which is rigidly secured, at 25, to the corresponding end portion of the beam 8 and said links 22 are pivotally secured, as at 26, to the clevis plate. The respective axes of the pivotal connections 23 and 26 are vertical.

In a like manner, a pair of vertically spaced horizontal links 27 are provided to connect the balancing bar 18 adjacent to its other end to a rearwardly extending clevis plate 28 which is rigidly secured, at 29, to the corresponding end portion of the draft beam 7. The connection of the links 27 with the clevis plate 28 is by means of a vertical pivot element 30 and the connection of the links 27 with the second end portion of the balancing bar 18 is by means of a vertical pivot element 31.

The beam 7 is pivotally attached adjacent to its second-named end by a vertical pivot element 32 to a pair of vertically spaced horizontal links 33 which respectively are disposed in straddling relation to the forks of the beam 7 and extend forwardly from their their connection with the forks of the beam 7 in straddling spaced relation to the stem or body portion of the beam 8 and to the shorter end portion of the balancing bar 18. The links 33 are connected at their forward ends by a clevis 34 to a double-tree 35, to the end portions of which a pair of aligned swingle trees 36 and 37, respectively, are attached.

A pair of vertically spaced horizontal links 38 have the rearward end portions thereof disposed in straddling relation to the forks of the beam 8 and are pivotally connected to the latter by a vertical pivot element 39 adjacent to the ends of the forks of the beam 8. The links 38 are connected at their forward ends by a clevis 40 to a secondary evener or draft bar 41, the latter being attached to the clevis 1 at a point approximately one-third of the distance from one end thereof to its other end. A swingle tree 43 is attached to the secondary evener 41 at the extremity of the longer end portion of the plate, as indicated at 43, and a double tree 44 is connected at 45, to the secondary evener 41 at the extremity of the shorter end portion of the latter. The double tree 41 has a pair of swingle trees 46 and 47, respectively, attached thereto at the opposite ends of the double tree 44, the arrangement being such that the swingle trees 46 and 47 will be disposed in alignment with each other and with the swingle trees 36, 37 and 42. It is to be noted at this point that the links 27 extend between the forks of the beam 8 and that the respective links 33 are disposed equi-distant above and below the horizontal plane which extends between the respective links 38 equidistant from the latter. Therefore, the pulling force transmitted to the draw plate 1 along the links 33 and the beam 7 will be transmitted to said draw plate in the same horizontal plane as the pulling force which is transmitted to the draw plate along the links 38 and the beam 8.

From the foregoing description of the various parts of the device, the operation thereof may be readily understood. In use, the draft animal that is hitched to the swingle tree 36 will walk in the last furrow and the draft animals hitched to the swingle trees 37, 46, 47 and 42 will walk on the unplowed ground. The draft on the respective draft animals will be equalized since the end portions of the respective primary draft beams 7 and 8 which are not connected with the draft animals are connected with each other through the agency of the pivoted balancing bar 18 and the links 22 and 27. The end portion of the balancing bar which has a length equal to one-third the full length of the balance bar is connected with an end portion of the primary draft beam 8, to the other end portion of which three draft animals are hitched, while the end portion of the balancing bar 18 which has a length equal to two-thirds of the total length of said balancing bar is connected by links 27 with an end portion of the draft beam 7, to which only two draft animals are attached. It will be manifest that with this arrangement the draft on the animals will be distributed equally and a straight forward pull on the implement of which the beam 6 is a part will result.

The draft equalizer for six draft animals which is shown in Figures 4, 5 and 6 conforms substantially in general construction and operation to the draft equalizer for five animals but differs from the latter in certain details of construction and arrangement of parts which will now be set out. The draw plate in the draft equalizer for six animals is indicated at 50 and the rearward end portion thereof is enlarged laterally at one side, as indicated at 51. The beam 7 is attached by a vertical pivot element 52 to the laterally enlarged portion 51 of the draw plate, the axis of the pivot element 52 intersecting the beam 7 intermediate the ends of the latter, as in the case of the draft equalizer for five animals but intersecting the draw plate 1 at a point lateral of the longitudinal median line of said draw plate instead of being disposed in intersecting relation to the longitudinal median line of the draw plate, as is the case in the draft equalizer for five animals. The beam 8 of the equalizer for six animals is attached by a vertical pivot element 53 to the draw plate 50. The axis of the vertical pivot element 53 intersects the draft beam 8 at a point approximately one-third of the distance from the end of the stem or body portion of the beam 8 to the forked end of the latter, and intersects the draw plate 50 at a point nearer to the longitudinal median line of the plate 50 than the pivot element 52 although lateral of such longitudinal median line.

The balancing bar 18 of the equalizer for six animals is pivotally connected, at 54, to the draw bar 50. The axis of the pivot element 54 intersects the balancing plate 18 at a point approximately one-third the distance from one end of the balancing bar to the other end thereof and intersects the plate 50 adjacent to the lateral edge of the draw plate opposite that to which the pivot element 52 is adjacent. It thus will be observed that the points to which the respective pivot elements 52, 53, and 54 intersect the draw plate 50 lie in a line which extends obliquely to the longitudinal median line of the draw plate. In the equalizer for six draft animals the links 33 are attached at their forward ends by the clevis 34 to a secondary evener 55. The point of connection of the clevis 34 with the secondary evener 55 is approximately one-third of the distance from the outer end of the evener 55 to the other end thereof. A double tree 56 is attached to the shorter end portion of the evener 55 at the extremity of the latter. A swingle tree 57 is attached to the longer end portion of the secondary evener 55 at the extremity of the latter. The swingle tree 57 is in alignment with swingle trees 58 and 59, respectively, which are attached to the opposite end portions of the double tree 56.

The links 38 are attached at their forward ends to a secondary evener 60 by the clevis 40, the point of connection of the clevis 40 with the secondary evener 60 being approximately one-third the distance from the outer end of the evener 60 to the other end thereof. The inner and longer end portion of the evener 60 is attached at its extremity to a swingle tree 61, and the outer and shorter end portion of the evener 60 is attached at its extremity to a double tree 62. Swingle trees 63 and 64, respectively, are attached to the opposite end portions of the double tree 62 at the extremities of the latter and are disposed in alignment with each other and with the swingle trees 61, 57, 58 and 59. The operation of the draft equalizer for six animals is identical in essential respects with the hereindescribed operation of the equalizer for five draft animals. The draft animal that is hinged to the swingle tree 58 will walk in the last furrow while the remaining draft animals will walk on unplowed ground.

In view of the arrangement of the secondary eveners 55 and 56, the primary draft beams 7 and 8, the balancing beam 18 and the links 22 and 27, it will be manifest that the pull exerted by the six draft animals will be transmitted in a single horizontal plane to the implement to which the draw plate 50 may be rigidly attached and that the draft will be distributed equally among the respective animals.

Obviously, my invention is susceptible of embodiment in forms other than those illustrated in the accompanying drawings and I, therefore, consider as my own all modifications and adaptations of the forms of the device herein described which fairly fall within the scope of the appended claim.

I claim:

A draft equalizer comprising a draw plate adapted to be secured at its rearward end to one end of an agricultural implement, a pair of spaced apart draft beams extending transversely across the draw plate and each being pivotally attached intermediate its ends to the draw plate, a balancing beam extending transversely across the draw plate in advance of said draft beams, motion transmitting means swingingly connecting one end of said balancing beam to the adjacent end of one of the draft beams, other motion transmitting means connecting the other end of said balancing beam with the adjacent end of the second draft beam, and means whereby draft animals may be hitched to the second ends of said draft beams.

EDWARD R. SPELLMAN.